United States Patent
Kuriiwa et al.

(10) Patent No.: US 11,370,949 B2
(45) Date of Patent: Jun. 28, 2022

(54) HOCU-BASED COLD-STORAGE MATERIAL, AND COLD-STORAGE DEVICE AND REFRIGERATING MACHINE EACH EQUIPPED THEREWITH

(71) Applicant: SANTOKU CORPORATION, Hyogo (JP)

(72) Inventors: Takahiro Kuriiwa, Hyogo (JP); Yasutomo Matsumoto, Hyogo (JP)

(73) Assignee: SANTOKU CORPORATION, Hyogo (JP)

( * ) Notice: Subject to any disclaimer, the term of this patent is extended or adjusted under 35 U.S.C. 154(b) by 265 days.

(21) Appl. No.: 16/608,532

(22) PCT Filed: Apr. 27, 2018

(86) PCT No.: PCT/JP2018/017131
§ 371 (c)(1),
(2) Date: Oct. 25, 2019

(87) PCT Pub. No.: WO2018/199278
PCT Pub. Date: Nov. 1, 2018

(65) Prior Publication Data
US 2021/0108121 A1 Apr. 15, 2021

(30) Foreign Application Priority Data
Apr. 28, 2017 (JP) .............................. JP2017-090513

(51) Int. Cl.
*C09K 5/14* (2006.01)
*C22C 28/00* (2006.01)
(Continued)

(52) U.S. Cl.
CPC ................. *C09K 5/14* (2013.01); *C09K 5/08* (2013.01); *C22C 28/00* (2013.01); *F25B 9/00* (2013.01);
(Continued)

(58) Field of Classification Search
CPC .. C09K 5/14; C09K 5/08; F25B 21/00; H01F 1/015; H01F 1/017; H01F 1/0306;
(Continued)

(56) References Cited

U.S. PATENT DOCUMENTS 5,186,765 A * 2/1993 Arai ..................... B22F 1/0014
148/301
5,447,034 A 9/1995 Kuriyama et al.
(Continued)

FOREIGN PATENT DOCUMENTS

CN 102453466 5/2012
CN 103031501 4/2013
(Continued)

OTHER PUBLICATIONS

Derwent English abstractor CN 103773995 A, to Ye et al., published May 2014 (Year: 2014).*
(Continued)

*Primary Examiner* — Jane L Stanley
(74) *Attorney, Agent, or Firm* — Wenderoth, Lind & Ponack, L.L.P.

(57) ABSTRACT

This invention provides a regenerator material having a high specific heat, particularly in the temperature range of 10 to 25K, and a regenerator and a refrigerator comprising the regenerator material. The present invention specifically provides an HoCu-based regenerator material represented by general formula (1): $HoCu_{2-x}M_x$ (1), wherein x is $0<x\leq 1$, and M is at least one member selected from the group consisting of Al and transition metal elements (excluding Cu), as well as a regenerator and a refrigerator comprising the regenerator material.

8 Claims, 4 Drawing Sheets

(51) Int. Cl.
   *F25B 9/00* (2006.01)
   *C09K 5/08* (2006.01)
   *H01F 1/053* (2006.01)
   *H01F 1/01* (2006.01)

(52) U.S. Cl.
   CPC ............ *H01F 1/017* (2013.01); *H01F 1/053* (2013.01); *F25B 2309/003* (2013.01)

(58) Field of Classification Search
   CPC ........ H01F 1/047; H01F 1/053; H01F 1/0536; H01F 1/06
   See application file for complete search history.

(56) References Cited

U.S. PATENT DOCUMENTS

| | | | |
|---|---|---|---|
| 5,593,517 A | 1/1997 | Saito et al. | |
| 6,022,486 A * | 2/2000 | Tokai | F02G 1/0445 165/4 |
| 6,334,909 B1 * | 1/2002 | Okamura | C09K 5/14 148/303 |
| 6,363,727 B1 | 4/2002 | Hashimoto et al. | |

FOREIGN PATENT DOCUMENTS

| | | |
|---|---|---|
| CN | 103773995 | 5/2014 |
| EP | 0 947 785 | 10/1999 |
| JP | 7-27434 | 1/1995 |
| JP | 7-133480 | 5/1995 |
| JP | 10-245651 | 9/1998 |
| JP | 11-325628 | 11/1999 |
| JP | 2000-1670 | 1/2000 |
| JP | 2000-199650 | 7/2000 |
| JP | 4445230 | 4/2010 |
| WO | 99/20956 | 4/1999 |

OTHER PUBLICATIONS

EPO machine translation of CN 103773995 A, to Ye et al., published May 2014 (Year: 2014).*

EPO Machine translation of CN 102453466 A, to Baogen et al., published May 2012 (Year: 2012).*

International Search Report dated Jun. 12, 2018 in International (PCT) Application No. PCT/JP2018/017131.

Wang et al., "Low-temperature reversible giant magnetocaloric effect in the HoCuAl compound", Journal of Applied Physics, vol. 114, 2013, pp. 163915-1 to 163915-4.

Dong et al., "Large magnetic entropy change and refrigerant capacity in rare-earth intermetallic RCuAl (R=Ho and Er) compounds", Journal of Magnetism and Magnetic Materials, vol. 324, 2012, pp. 2676-2678.

Masami et al., "HoCu$_2$ High-Performance Magnetic Regenerator Material", vol. 55, No. 1, 2000, pp. 64-67, Abstract & cited in Specification.

* cited by examiner

HOCU-BASED COLD-STORAGE MATERIAL, AND COLD-STORAGE DEVICE AND REFRIGERATING MACHINE EACH EQUIPPED THEREWITH

TECHNICAL FIELD

The present invention relates to an HoCu-based regenerator material, and a regenerator and a refrigerator comprising the material.

BACKGROUND ART

Superconducting magnets have currently been put into practice, or the application thereof toward practical use has been advanced, in superconducting MRI (magnetic resonance imaging) systems for photographing tomograms in the medical field; maglev trains; superconducting magnetic energy storage (SMES) systems; and the like. Superconducting magnets must be cooled to a cryogenic temperature of 4.2K (about −269° C.), which is the boiling point of liquid helium (He); however, since liquid helium is expensive and requires a high level of skill for handling, high-performance small refrigerators have been developed as a cooling means alternative to liquid helium. As small refrigerators that have been put into practical use, Gifford-McMahon type small helium refrigerators (GM refrigerators), pulse tube refrigerators, and the like are known. In these refrigerators, for example, when pre-cooled compressed helium is sent to a regenerator filled with a regenerator material, the compressed helium passes through the regenerator while expanding; as a result, the regenerator is cooled. Further, the regenerator material is also cooled when the helium sent to the regenerator is removed by reducing the pressure. The regenerator is further cooled as the cycle is repeated, and reaches the target temperature. Thus, to achieve a cryogenic temperature, it is important for the regenerator material that 1) the regenerator material is capable of sufficiently exchanging heat with compressed helium passing through the regenerator while expanding, and 2) the regenerator material has a specific heat that enables supply of sufficient heat to expanding compressed helium or heat storage. Moreover, for example, a method in which a mesh-like regenerator material is used, and a method in which a regenerator material in the form of a spherical powder is closely packed are known, in terms of improving the performance of a refrigerator by increasing the specific surface area of a regenerator material.

In conventional small refrigerators, copper (Cu) or lead (Pb) is used as a regenerator material charged into a regenerator. Although regenerator materials are required to have a high specific heat in a low-temperature range, copper is used at temperatures from room temperature to about 80K; whereas the specific heat of lead, which is mainly based on the lattice specific heat, rapidly decreases along with a decrease in temperature. Therefore, lead has generally been used at a temperature of 20K or more. In recent years, lead has been replaced with bismuth (Bi) due to the RoHS Directive (Directive on the Restriction of the Use of Certain Hazardous Substances). However, since bismuth has a specific heat lower than that of lead in most low-temperature ranges, the development of a new regenerator material as an alternative to bismuth has been desired, in view of improving the performance of small refrigerators.

Non-patent Literature 1 discloses holmium copper 2 ($HoCu_2$) as an antiferromagnet regenerator material with excellent specific heat characteristics at a low-temperature range of less than 10K. Holmium Copper 2 is a material showing two large specific heat peaks (about 6.7K and about 8.2K) accompanying the two magnetic transitions in a low-temperature range of less than 10K. Since holmium copper 2 is an antiferromagnet, it is barely influenced by the magnetic field, and therefore has been suitably used for MRI etc. Holmium copper 2 also has relatively high specific heat characteristics, which are considered to be due to the Schottky specific heat, in the temperature side higher than the specific heat peak at about 8.2K; however, it has low specific heat characteristics in the temperature range of about 10 to 25K.

Patent Literature 1 discloses, as improved cryogenic regenerator materials, for example, "a cryogenic regenerator material, wherein a regenerator material formed only from bismuth and a magnetic regenerator material composed of $HoCu_2$ are used in combination" (claim 1) and "a cryogenic regenerator material, wherein a regenerator material formed from an alloy containing bismuth as a main component and 5 to 10% antimony, and a magnetic regenerator material composed of $HoCu_2$ are used in combination" (claim 2). The specific heat peaks of the cryogenic regenerator materials of Patent Literature 1 are shifted to the high-temperature side, compared with that of holmium copper 2 alone, and these regenerator materials have specific heat peaks in the temperature range of 10 to 25K; however, the specific heat peaks are small.

CITATION LIST

Patent Literature

PTL 1: JP4445230B

Non-Patent Literature

NPL 1: $HoCu_2$ High-Performance Magnetic Regenerator Material, Masami Okamura et al., Toshiba Review, 2000, Vol. 55, No. 1

SUMMARY OF INVENTION

Technical Problem

As described above, holmium copper 2 has good specific heat characteristics in the temperature range of 4 to 10K as a cryogenic regenerator material. Lead has relatively good specific heat characteristics in a temperature range of 20K or more; however, due to the RoHS Directive, lead is currently being replaced with bismuth, which shows a certain level of specific heat in a temperature range of 25K or more. Thus, a material having a high specific heat in the broad temperature range of 10 to 25K has not yet been found, and there is a demand for such a material.

Therefore, a primary object of the present invention is to provide a regenerator material having a high specific heat, particularly in the temperature range of 10 to 25K; and a regenerator and a refrigerator comprising the regenerator material.

Solution to Problem

The present inventors conducted extensive research to achieve the above object, and found that the object can be achieved by a material in which Cu in $HoCu_2$ is partially replaced by at least one member (M) selected from the group consisting of Al and transition metal elements (excluding Cu); and a material in which Cu in HoCu$_2$ is partially replaced by at least one member (M) selected from the group consisting of Al and transition metal elements (excluding Cu), and, additionally, Ho is partially replaced by one or more rare earth elements (RE). The present invention was thus accomplished.

Specifically, the present invention relates to the following HoCu-based regenerator material, and the following regenerator and refrigerator comprising the regenerator material.

1. An HoCu-based regenerator material represented by general formula (1):

$$HoCu_{2-x}M_x \quad (1)$$

wherein x is 0<x≤1, and M is at least one member selected from the group consisting of Al and transition metal elements (excluding Cu).

2. The HoCu-based regenerator material according to Item 1, wherein M is Ni; and the HoCu-based regenerator material is represented by general formula (2):

$$HoCu_{2-x}Ni_x \quad (2)$$

wherein x is 0<x≤1.

3. The HoCu-based regenerator material according to Item 1, wherein M is Al; and the HoCu-based regenerator material is represented by general formula (3):

$$HoCu_{2-x}Al_x \quad (3)$$

wherein x is 0<x<1.

4. An HoCu-based regenerator material represented by general formula (4):

$$(Ho_{1-y}RE_y)Cu_{2-x}M_x \quad (4)$$

wherein x is 0<x≤1, M is at least one member selected from the group consisting of Al and transition metal elements (excluding Cu), y is 0<y<1, and RE is one or more rare earth elements (excluding Ho).

5. The HoCu-based regenerator material according to Item 4, wherein M is Ni, RE is Er, and the HoCu-based regenerator material is represented by general formula (5):

$$(Ho_{1-y}Er_y)Cu_{2-x}Ni_x \quad (5)$$

wherein x is 0<x≤1, and y is 0<y<1.

6. A regenerator filled with the HoCu-based regenerator material according to any one of Items 1 to 5 alone or in combination with one or more other regenerator materials.

7. The regenerator according to Item 6, wherein the HoCu-based regenerator material is in a state of 1) a spherical particle group or 2) a sintered body of a spherical particle group.

8. A refrigerator comprising the regenerator according to Item 6 or 7.

Advantageous Effects of Invention

Since the HoCu-based regenerator material of the present invention has a high specific heat, particularly in the temperature range of 10 to 25K, the HoCu-based regenerator material of the present invention is suitable for refrigeration use in this temperature range.

DESCRIPTION OF EMBODIMENTS

Figure 1:
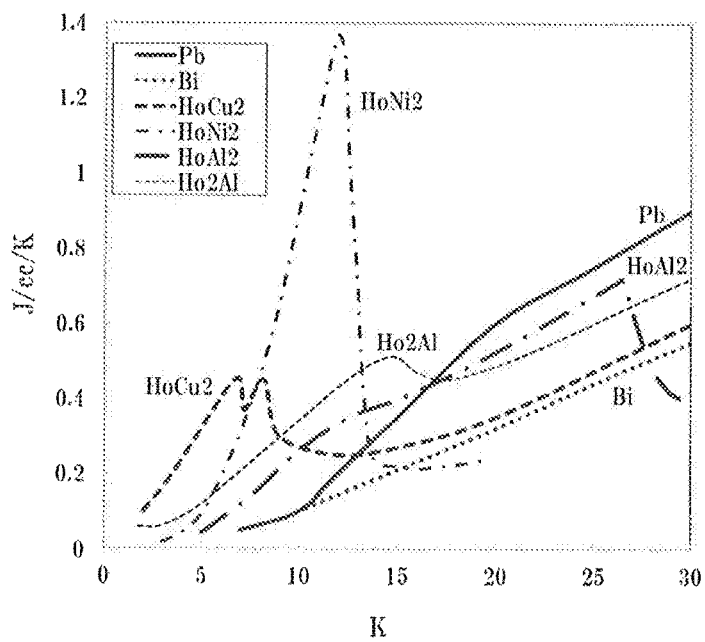
FIG. 1 shows the relationship between the temperature and the specific heat of previously known regenerator materials.

The HoCu-based regenerator material, and a regenerator and a refrigerator comprising the HoCu-based regenerator material, are described below.

1. HoCu-Based Regenerator Material

The HoCu-based regenerator material of the present invention has a structure in which Cu contained in HoCu$_2$ (holmium copper 2) is partially replaced by at least one member selected from the group consisting of Al and transition metal elements (excluding Cu); and is represented by general formula (1) below:

$$HoCu_{2-x}M_x \quad (1)$$

wherein x is 0<x≤1, and M is at least one member selected from the group consisting of Al and transition metal elements (excluding Cu).

Preferable examples of transition metal elements excluding Cu include, but are not limited to, at least one of Ni (nickel), Co (cobalt), Fe (iron), etc. HoCu$_2$ has a KHg$_2$-type (body-centered orthorhombic crystals; Pearson symbol: oI12) crystal structure. It is important that the HoCu-based regenerator material of the present invention has a KHg$_2$-type structure as a main phase. Such a material is obtained when Cu is partially replaced by M (at least one member selected from the group consisting of Al and transition metal elements excluding Cu). M is more preferably at least one of Ni and Al, among the above.

x, which indicates the amount of M, may be in the range of 0<x≤1, particularly preferably 0<x≤0.8, and more preferably 0<x≤0.5.

In particular, when M is Ni in general formula (1), the HoCu-based regenerator material is represented by general formula (2):

$$HoCu_{2-x}Ni_x \quad (2)$$

wherein x is 0<x≤1.

x may be in the range of 0<x≤1, particularly preferably 0<x≤0.8, and more preferably 0<x≤0.5. The HoCu-based regenerator material represented by general formula (2) is substantially a single-phase alloy (KHg$_2$-type structure).

In particular, when M is Al in general formula (1), the HoCu-based regenerator material is represented by general formula (3):

$$HoCu_{2-x}Al_x \quad (3)$$

wherein x is 0<x<1.

x may be in the range of 0<x<1, particularly preferably 0<x≤0.8, and more preferably 0<x≤0.5. The HoCu-based regenerator material represented by general formula (3) has a $KHg_2$-type structure as a main phase, and further has, for example, an HoCuAl phase as a second phase (minor phase).

The HoCu-based regenerator material of the present invention also includes those with a structure in which Cu contained in $HoCu_2$ (holmium copper 2) is partially replaced by at least one member selected from the group consisting of Al and transition metal elements (excluding Cu), and Ho is partially replaced by RE (one or more rare earth elements excluding Ho). In this case, it is also important that the HoCu-based regenerator material of the present invention is a material having a $KHg_2$-type structure as a main phase.

Specifically, the HoCu-based regenerator material is represented by general formula (4):

$$(Ho_{1-y}RE_y)Cu_{2-x}M_x \qquad (4);$$

wherein x is 0<x≤1, M is at least one member selected from the group consisting of Al and transition metal elements (excluding Cu), y is 0<y<1, and RE is one or more rare earth elements (excluding Ho).

Here, the type of M and x, which indicates the amount of M, are as described above. RE is not limited, as long as it is one or more rare earth elements excluding Ho. Examples include Ce (cerium), Pr (praseodymium), Sm (samarium), Eu (europium), Gd (gadolinium), Tb (terbium), Dy (dysprosium), Er (erbium), Tm (thulium), Yb (ytterbium), and Lu (lutetium). A material having a $KHg_2$-type structure as a main phase is obtained when Ho is partially replaced by one or more rare earth elements described above (RE). As the RE (one or more rare earth elements), Gd, Tb, Dy, Er, Tm, Yb, and Lu, which are heavy rare earth elements, are preferable; and Er is particularly preferable among these. These rare earth elements (RE) may be used singly, or in a combination of two or more.

x, which indicates the amount of M, may be in the range of 0<x≤1, particularly preferably 0<x≤0.8, and more preferably 0<x≤0.5.

y, which indicates the amount of RE, may be in the range of 0<y<1, particularly preferably 0<y≤0.8, and more preferably 0<y≤0.5.

In particular, when M is Ni in general formula (4), the HoCu-based regenerator material is represented by general formula (5):

$$(Ho_{1-y}Er_y)Cu_{2-x}Ni_x \qquad (5)$$

wherein x is 0<x≤1, and y is 0<y<1.

x is preferably 0<x≤0.8, and more preferably 0<x≤0.5. y may be in the range of 0<y<1; and the amount of y may be adjusted so that a predetermined specific heat peak temperature is obtained, taking into consideration the amount of x and the shift of the specific heat peak.

The following is considered to be the reason the regenerator material of the present invention exhibits the predetermined effects of the present invention.

To obtain a magnetic regenerator material with high specific heat characteristics in a broad temperature range, it is also important to utilize the Schottky specific heat. It is possible that a desired material with a large specific heat at 10 to 25K can be obtained by using $HoCu_2$ as a base; and, for example, 1) applying a replacement element that can increase the magnetic transition temperature, or 2) designing an alloy so that the Schottky specific heat is increased, while maintaining the $KHg_2$-type structure as a main phase.

An additional explanation is given below for the Schottky specific heat. For example, around room temperature, lattice vibrations mainly contribute to the specific heat of crystals. Thus, the contribution of lattice vibrations to the specific heat decreases in a cryogenic temperature range, and the specific heat of common metals rapidly decreases in a cryogenic temperature range. On the other hand, rare earth ions in crystals have electrons in the 4f orbital, the localization of which is strong; and the 4f orbital electrons are affected by a crystal field, and take on a discrete energy level. That is, the 4f electrons are in a ground state at a temperature near 0K, and are excited to a higher level when the temperature increases to reach an energy corresponding to a discrete level. Therefore, a high specific heat is exhibited at a specific temperature. The abnormal specific heat due to this excitation is called "Schottky specific heat."

Focusing on Cu, which is a constituent element of $HoCu_2$ alloy, Cu and Ni both have a Cu-type structure (cF4, face-centered cubic crystals) at about room temperature and can form a complete solid solution, with reference to a Cu—Ni binary phase diagram. Specifically, $HoCu_2$ alloy and $HoNi_2$ alloy have different crystal structures; however, it is possible that an alloy in which Cu in $HoCu_2$ alloy is partially replaced by Ni and the $KHg_2$-type structure is maintained can be obtained as an alloy that cannot be inferred from the heat storage characteristics of the two alloys $HoCu_2$ and $HoNi_2$.

Focusing on $HoAl_2$, $HoAl_2$ has an $MgCu_2$-type structure (cF24, face-centered cubic crystals), whereas $HoCu_2$ has a $KHg_2$-type structure (oI12, body-centered orthorhombic crystals). $HoAl_2$ and $HoCu_2$ have different crystal structures. Al and Cu both have a Cu-type structure (cF4, face-centered cubic crystals) at about room temperature, and Al is solid-soluble in an amount of about 4 to 5 atomic % in Cu, with reference to a Cu—Al binary phase diagram (however, Cu is not solid-soluble in Al).

In Ho—Cu—Al-based alloy, formation of an HoCuAl phase (ZrNiAl structure) as an intermediate phase is indicated. It is possible that an alloy having a $KHg_2$-type structure, and having characteristics that cannot be inferred from the heat storage characteristics of the two alloys $HoCu_2$ and $HoAl_2$, can be obtained by partially replacing Cu in $HoCu_2$ by Al.

In light of the above, the present invention proposes an HoCu-based regenerator material having specific heat characteristics at cryogenic temperatures that cannot be inferred from the heat storage characteristics of the two alloys $HoCu_2$ and $HoNi_2$, by using $HoCu_2$ alloy as a base; and partially replacing Cu by at least one member selected from the group consisting of Al and transition metal elements (excluding Cu); or in addition to the partial replacement, further partially replacing Ho by RE (a rare earth element excluding Ho).

The HoCu-based regenerator material of the present invention may comprise impurities other than the elements mentioned above in an amount that does not significantly affect the specific heat characteristics of the material. In the present invention, there may be, for example, a case in which a raw material initially contains a trace amount of impurities, or a case in which impurities are introduced when the HoCu-based regenerator material is prepared. The term "impurities" as used herein means components that are not added intentionally in each case.

2. Regenerator and Refrigerator

A regenerator may be constituted by filling it with the HoCu-based regenerator material of the present invention alone, or in combination with one or more other regenerator materials. The other regenerator materials are not limited, and known regenerator materials may be appropriately combined. Further, a refrigerator (for example, a refrigerator for liquid hydrogen production, or a 10K-specific refrigerator) provided with the regenerator can be constituted. Moreover, in a 4KGM refrigerator, the HoCu-based material of the present invention may be incorporated between a material for the low-temperature end side, and a material for temperatures up to, for example, 80K.

The properties of the HoCu-based regenerator material in the regenerator are not limited, and may be appropriately selected from 1) a state of a spherical particle group; or 2) a state of a sintered body of a spherical particle group, according to the use etc.

When the HoCu-based regenerator material is used in the state of a spherical particle group, for example, a raw material that is mixed so as to have a predetermined composition after dissolution and casting is prepared, and then the raw material is dissolved in a melting furnace such as a vacuum high-frequency melting furnace under an inert gas atmosphere; then, the spherical HoCu-based regenerator material is obtained by an atomizing method such as gas atomization or disk atomization, a rotating electrode method, or the like. In doing so, by preparing the HoCu-based regenerator material under rapid cooling conditions, a single phase is easily obtained in a wide range of composition. The rapid cooling conditions are not limited, and an atomizing method such as gas atomization or water atomization that can be performed at a cooling rate of $10^3$/sec or more is preferable. Further, by performing sieving and shape classification as necessary, a desired powder can be obtained. The particle size of the spherical particles is not limited, and is preferably in the range of not less than 100 μm and not more than 750 μm, and more preferably in the range of not less than 100 μm and not more than 300 μm.

The aspect ratio of the spherical HoCu-based regenerator material is preferably 10 or less, more preferably 5 or less, and most preferably 2 or less. By using a spherical HoCu-based regenerator material having a small aspect ratio, it is possible to enhance the filling property into the regenerator, and more easily obtain a sintered body having uniform communication holes when the sintered body of a spherical particle group is obtained. In the measurement of aspect ratio in this specification, the spherical powder of the HoCu-based regenerator material is mixed well, and then a sample obtained by the quartering method is subjected to aspect ratio measurement with an optical microscope by using 100 arbitrary particles. Then, an average value of the measured values is calculated. This method is repeated 3 times, and the average value of 3 measurements is found as the aspect ratio.

When the HoCu-based regenerator material is used in the form of a sintered body of spherical powder, the spherical powder of the HoCu-based regenerator material is introduced into a mold; and then subjected to a heat treatment for not less than an hour and not longer than 40 hours at a temperature of hot less than 700° C. and not more than 1200° C., in an atmosphere furnace in an inert gas atmosphere of Ar, nitrogen, or the like, thereby obtaining a sintered body. By controlling the temperature and the duration of the heat treatment, the filling rate of the HoCu-based regenerator material in the obtained sintered body can be controlled. The heat treatment can also be performed by an electric current sintering method, a hot-pressing method, or the like. The porosity in the sintered body is not limited, and is preferably in the range of 28 to 40%, further preferably in the range of 32 to 37%. When the porosity is within the above range, the HoCu-based regenerator material can be charged into the regenerator at a high filling rate.

The porosity in this specification refers to a value determined according to the following formula.

$$(1-\text{measured weight}/(\text{apparent volume} \times \text{specific gravity})) \times 100$$

(provided that the apparent volume means, for example, for a cylindrical sample, a volume obtained from the diameter and the length)

The shape and size of the sintered body are not particularly limited, and may be appropriately selected according to the shape of the regenerator. For example, the shape of the sintered body may be a cylindrical shape, a prismatic shape, or the like. In addition, the sintered body may also have a tapered shape, in view of engagement or the like.

The shape of the sintered body can be adjusted upon sintering of the spherical powder by charging the spherical powder into a container having a desired shape. For example, if the sintered body has a cylindrical shape, a cylindrical container may be filled with the spherical powder, and sintering may be performed.

The sintered body may have a multilayer structure. The multilayer structure herein means, for example, in the case of a cylindrical shape, a structure in which a single or plural outer layers are formed on the outside of the inner layer. Examples of such a multilayer structure include a structure formed from a plurality of layers having different porosities. The multilayer structure may also be a structure in which a plurality of layers are formed from different types of materials. The multilayer structure may further be, for example, a laminate in which a plurality of layers with different specific heat characteristics are laminated in order.

EXAMPLES

The present invention is more specifically explained below in reference to Examples. However, the present invention is not limited to these Examples.

Examples 1 to 4 and Comparative Examples 1 to 5 (Synthesis of Each Regenerator Material Alloy Powder)

First, raw materials, each of which was mixed to have the composition shown in Table 1 after dissolution and casting, were prepared; and dissolved in an argon gas atmosphere in a high-frequency, heat-melting furnace, thereby obtaining molten alloys.

Next, the alloys were sufficiently stirred and rapidly cooled (rapid cooling conditions: $10^3$K/sec or more) by an atomizing method, thereby obtaining alloy powders.

Thereafter, in order to increase the homogeneity of the composition of each alloy powder, a homogenization treatment was performed for 0.01 to 40 hours at a temperature equal to 95% of the melting point obtained from the phase diagram; followed by coarse pulverization, if necessary, thereby obtaining alloy powders having an average particle size (D50) of 50 to 300 μm.

Figure 2:
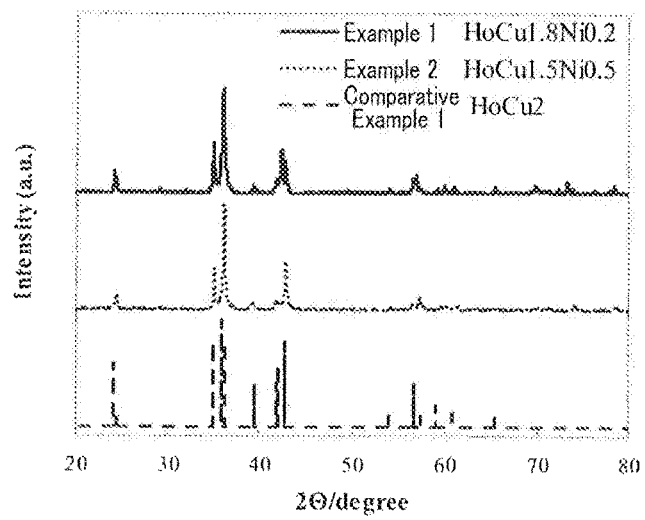
FIG. 2 shows X-ray diffraction results of the HoCu-based regenerator materials obtained in Examples 1 and 2, and a regenerator material for comparison (Comparative Example 1).
Figure 3:
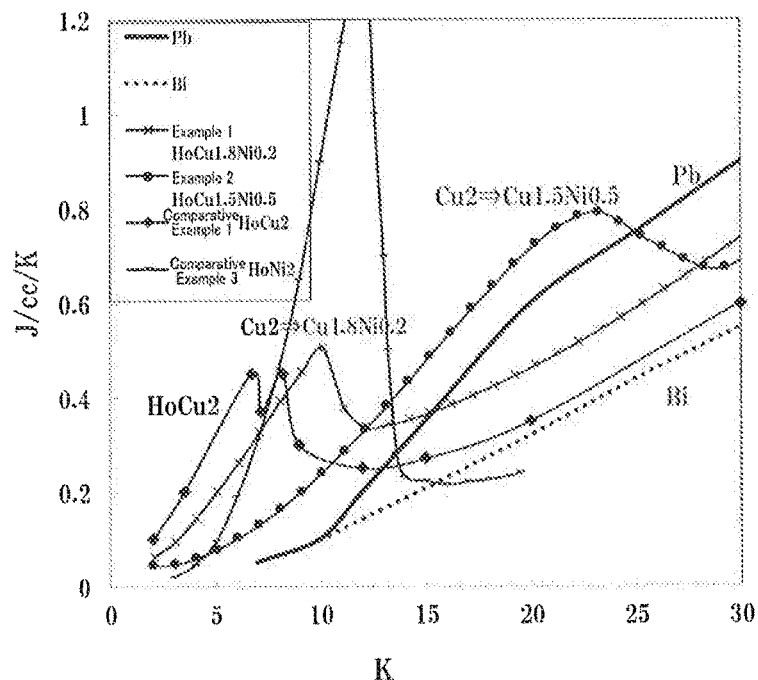
FIG. 3 shows the relationship between the temperature and the specific heat of the HoCu-based regenerator materials obtained in Examples 1 and 2, and regenerator materials for comparison (Pb, Bi, and Comparative Examples 1 and 3).
Figure 4:
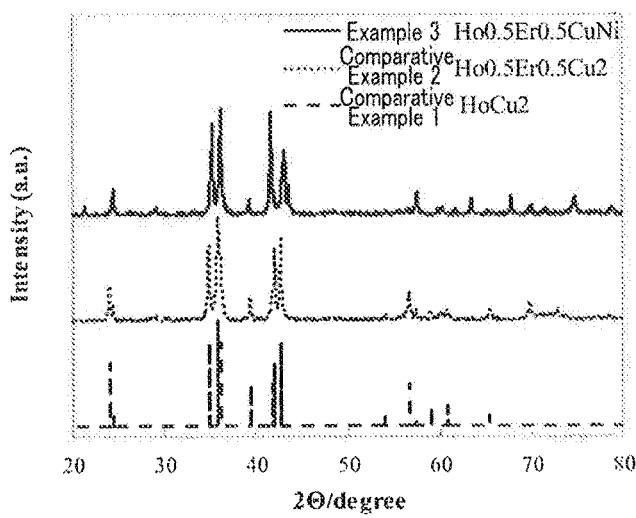
FIG. 4 shows X-ray diffraction results of the HoCu-based regenerator material obtained in Example 3, and regenerator materials for comparison (Comparative Examples 1 and 2).
Figure 5:
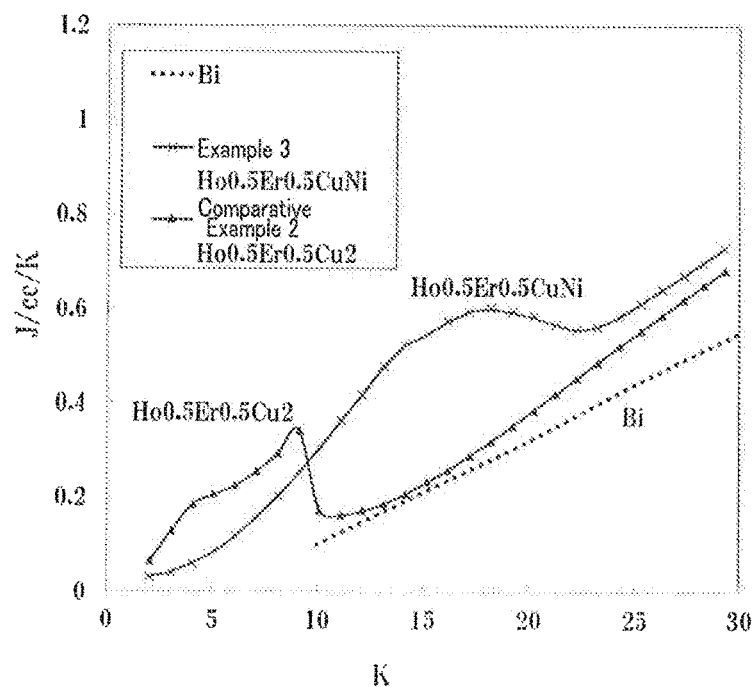
FIG. 5 shows the relationship between the temperature and the specific heat of the HoCu-based regenerator material obtained in Example 3, and regenerator materials for comparison (Bi and Comparative Example 2).
Figure 6:
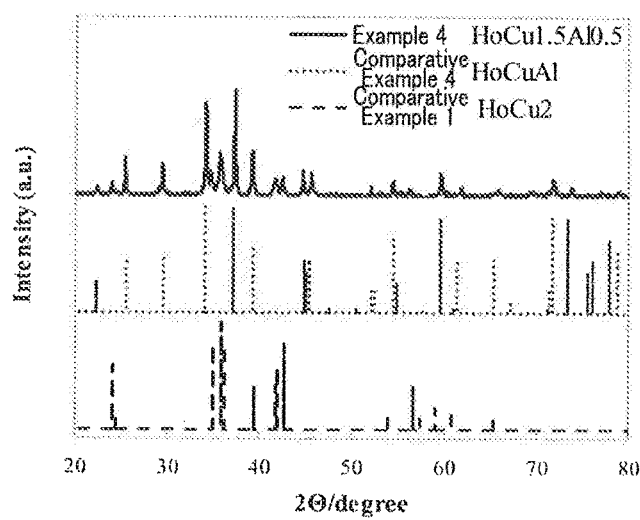
FIG. 6 shows X-ray diffraction results of the HoCu-based regenerator material obtained in Example 4, and regenerator materials for comparison (Comparative Examples 1 and 4).
Figure 7:
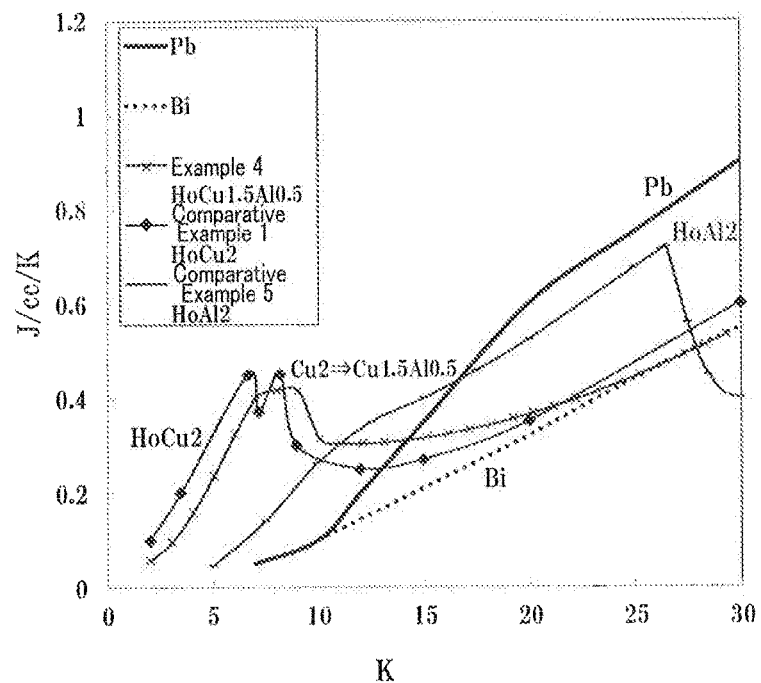
FIG. 7 shows the relationship between the temperature and the specific heat of the HoCu-based regenerator material obtained in Example 4, and regenerator materials for comparison (Pb, Bi, and Comparative Examples 1 and 5).

Subsequently, X-ray diffraction measurement of each alloy powder was performed. FIGS. 2, 4, and 6 show the results. Further, the specific heat of each alloy powder was determined by a thermal relaxation method using a PPMS (Physical Property Measurement System). FIGS. 3, 5, and 7 show the results. Table 1 shows evaluation (determination) of the composition, the constituent phase, and the specific heat characteristics of each alloy powder. In the determination column of Table 1, when an alloy with a $KHg_2$-type structure as a main phase had a high specific heat in the temperature range of 10 to 25K, it was evaluated as "A"; and an alloy that did not have such a specific heat was evaluated as "B."

TABLE 1

| | Composition | Constituent Phase | Determination |
|---|---|---|---|
| Example 1 | $HoCu_{1.8}Ni_{0.2}$ | $KHg_2$-type phase | A |
| Example 2 | $HoCu_{1.5}Ni_{0.5}$ | $KHg_2$-type phase | A |
| Example 3 | $(Ho_{0.5}Er_{0.5})CuNi$ | $KHg_2$-type phase | A |
| Example 4 | $HoCu_{1.5}Al_{0.5}$ | $KHg_2$-type phase (main phase) + ZrNiAl phase | A |
| Comparative Example 1 | $HoCu_2$ | $KHg_2$-type phase | B |
| Comparative Example 2 | $(Ho_{0.5}Er_{0.5})Cu_2$ | $KHg_2$-type phase | B |
| Comparative Example 3 | $HoNi_2$ | $MgCu_2$-type phase | B |
| Comparative Example 4 | HoCuAl | ZrNiAl-type phase | B |
| Comparative Example 5 | $HoAl_2$ | $MgCu_2$-type phase | B |

Specific Heat Characteristics of Alloy Powders Obtained in Examples and Comparative Examples The results of X-ray diffraction shown in FIG. 2 reveal that each of the alloy powders of Comparative Example 1, and Examples 1 and 2 had a $KHg_2$-type structure as a main phase.

The results of the specific heat at cryogenic temperatures shown in FIG. 3 reveals that the specific heat peak of each of the alloy powders of Examples 1 and 2 was shifted to the high-temperature side, compared with that of the alloy powder ($HoCu_2$) of Comparative Example 1. The shift to the high-temperature side is considered to depend to some extent on the replacement amount by Ni. Further, each of the powders of Examples 1 and 2 exhibited improved specific heat characteristics, which are considered to be derived from the Schottky specific heat, in the temperature side higher than the specific heat peak; and showed a higher specific heat than the alloy powder ($HoCu_2$) of Comparative Example 1 in a temperature range of 10K or more.

With reference to FIG. 3, the alloy powder ($HoNi_2$) of Comparative Example 3 has the following specific heat characteristics: it exhibited a high specific heat peak at a temperature around 12K, compared with the alloy powder ($HoCu_2$) of Comparative Example 1; however, it had an extremely low specific heat in the other temperature ranges. In contrast, although the specific heat of the alloy powder of Example 1 decreased in a temperature range higher than the specific heat peak, it increased in a temperature range of, for example, 12K or more due to contribution of the Schottky specific heat, compared with that of the alloy powder of Comparative Example 3. The alloy powder of Example 2 exhibited a specific heat peak at a higher temperature than the alloy powder of Comparative Example 3. The above results show that alloys having high specific heat characteristics at 10 to 25K, which is a target temperature in an $Ho(Cu, Ni)_2$-based alloy having a $KHg_2$-type structure as a main phase, were obtained.

Many $RECu_2$ alloys, including $HoCu_2$ alloy, have a $KHg_2$-type structure. On the other hand, $RENi_2$ alloys have an $MgCu_2$-type structure. Thus, an $(RE)(Cu, Ni)_2$ alloy that maintains a $KHg_2$-type structure as a main phase as in the alloy powders of Examples 1 and 2 is also expected to exhibit, for example, a specific heat peak at a higher temperature.

Next, the effects of $(Ho_{0.5}Er_{0.5})Cu_2$ of Comparative Example 2, in which Ho is partially replaced by RE (excluding Ho) and $(Ho_{0.5}Er_{0.5})CuNi$ of Example 3, are described.

As is clear from FIG. 4, the alloy powders of Comparative Example 2 and Example 3 each have a $KHg_2$-type structure as a main phase.

The results of the specific heat at cryogenic temperatures shown in FIG. 5 reveal that the specific heat peak of the sample of Example 3 was shifted to the high-temperature side, compared with that of Comparative Example 2. Further, the powder of Example 3 exhibited improved specific heat characteristics, which are considered to be derived from the Schottky specific heat, in the temperature side higher than the specific heat peak, specifically in a temperature range of 20K or more. It was confirmed that the alloy that contains as a base another $RECu_2$-based alloy with a $KHg_2$-type structure into which the $KHg_2$-type structure is maintained as a main phase structure, although Ni is introduced, exhibited improved characteristics similar to those of Examples 1 and 2, as compared with Comparative Example 1.

As is clear from FIG. 6, the alloy powder of Example 4 contains a $KHg_2$-type structure phase as a main phase and an MgCuAl phase (ZrNiAl structure) as a heterogeneous phase, indicating that an alloy having a $KHg_2$-type structure as a main phase was obtained.

The results of the specific heat at cryogenic temperatures shown in FIG. 7 reveal that, focusing on the specific heat peak of $HoCu_{1.5}Al_{0.5}$ of Example 4, for example, the basic peak temperature is close to those of the $HoCu_2$ alloy of Comparative Example 1; however, an improvement in specific heat characteristics, which are considered to be derived from the Schottky specific heat, was observed in a temperature range higher than the specific heat peak (around 10 to 23K). In the $HoAl_2$ alloy of Comparative Example 5 for reference, 1) the Schottky specific heat was low; and 2) compared with the specific heat change between the $HoCu_2$ alloy and the $HoCu_{1.5}Al_{0.5}$ alloy, the difference in characteristics between the $HoCu_2$ alloy and the $HoAl_2$ alloy was large (their characteristics greatly differed from each other). This is considered to be because an improvement in characteristics was achieved by designing the $HoCu_{1.5}Al_{0.5}$ alloy as an alloy that contains a $KHg_2$-type phase, which is the alloy design principle of the present invention, and is substantially free of the $MgCu_2$-type phase, in order to obtain an alloy having a desired crystal structure.

The invention claimed is:

1. An HoCu-based regenerator material represented by formula (3):

$$HoCu_{2-x}Al_x \qquad (3)$$

wherein x is 0<x<1,
the HoCu-based regenerator material having a $KHg_2$-type crystal structure as a main phase and an HoCuAl phase as a second phase, and
the HoCu-based regenerator material having a higher specific heat than $HoCu_2$ in a temperature range of 10K or more.

2. A regenerator filled with the HoCu-based regenerator material according to claim 1, either alone or in combination with one or more other regenerator materials.

3. The regenerator according to claim 2, wherein the HoCu-based regenerator material is in a state of (1) a spherical particle group, or (2) a sintered body of a spherical particle group.

4. A refrigerator comprising the regenerator according to claim 2.

5. An HoCu-based regenerator material represented by formula (4):

$$(Ho_{1-y}RE_y)Cu_{2-x}Al \qquad (4)$$

wherein x is $0<x<1$, y is $0<y<1$, and RE is one or more rare earth elements with the proviso that RE does not contain Ho, the HoCu-based regenerator material having a $KHg_2$-type crystal structure as a main phase and an HoCuAl phase as a second phase, and the HoCu-based regenerator material having a higher specific heat than $HoCu_2$ in a temperature range of 10K or more.

6. A regenerator filled with the HoCu-based regenerator material according to claim 5, either alone or in combination with one or more other regenerator materials.

7. The regenerator according to claim 6, wherein the HoCu-based regenerator material is in a state of (1) a spherical particle group, or (2) a sintered body of a spherical particle group.

8. A refrigerator comprising the regenerator according to claim 6.

* * * * *